United States Patent
Pitsch et al.

(10) Patent No.: US 7,360,077 B2
(45) Date of Patent: Apr. 15, 2008

(54) PRODUCTION LINE BOOT SECTOR LOCK

(75) Inventors: Robert Alan Pitsch, Carmel, IN (US); John Joseph Curtis, III, Noblesville, IN (US)

(73) Assignee: Thomson Licensing, Boulogne Billancourt (FR)

( * ) Notice: Subject to any disclaimer, the term of this patent is extended or adjusted under 35 U.S.C. 154(b) by 581 days.

(21) Appl. No.: 10/507,866

(22) PCT Filed: Mar. 19, 2003

(86) PCT No.: PCT/US03/08354

§ 371 (c)(1),
(2), (4) Date: Sep. 16, 2004

(87) PCT Pub. No.: WO03/079753

PCT Pub. Date: Oct. 2, 2003

(65) Prior Publication Data

US 2005/0105006 A1 May 19, 2005

Related U.S. Application Data

(60) Provisional application No. 60/366,319, filed on Mar. 20, 2002.

(51) Int. Cl.
*G06F 9/00* (2006.01)
(52) U.S. Cl. .................. 713/151; 713/100; 725/153; 725/146; 725/152
(58) Field of Classification Search ............... 713/151, 713/100; 725/153, 146, 152
See application file for complete search history.

(56) References Cited

U.S. PATENT DOCUMENTS 6,345,256 B1   2/2002   Milsted et al.

OTHER PUBLICATIONS

Search report dated Jan. 12, 2004.

*Primary Examiner*—Thomas R. Peeso
(74) *Attorney, Agent, or Firm*—Joseph J. Laks; Harvey D. Fried; Patricia Verlangieri

(57) ABSTRACT

Hacking of a class of Set-Top Boxes known as Integrated Receiver-Decoders (IRDs) used to receive satellite broadcasts for display on television sets is prevented by use of connections to the reprogramming enable pin of a flash memory. If a user attempts to reprogram the boot sector of the flash memory in order to obtain free service via privacy, the set-top box is destroyed. The invention relates to the design and manufacture of IRDs that are resistant to hacking via unauthorized reprogramming.

18 Claims, 1 Drawing Sheet

PRODUCTION LINE BOOT SECTOR LOCK

CROSS-REFERENCE TO RELATED APPLICATIONS

Benefit of Provisional Patent Application 60/366,319, filed Mar. 20, 2002, is claimed.

TECHNICAL FIELD

This application claims the benefit, under 35U.S.C. § 365 of International Application PCT/US03/08354, filed Mar. 19, 2003, which was published in accordance with PCT Article 21(2) on Oct. 2, 2003 in English and which claims the benefit of U.S. patent application Ser. No. 60/366,319, filed Mar. 20, 2002.

BACKGROUND ART

A STB is any electronic device designed to produce output on a conventional television set, having one or more inputs connected to a communications channel such as telephone, ISDN, optical fiber, or cable. The STB usually runs software to allow the user to interact with the programs shown on the television in some way. An IRD functions to receive and decode an incoming transport stream, often in MPEG-2 format, and present the output to the user on a television set. The user interacts with the TV and the STB via a remote control.

The IRD is connected to a satellite dish via a cable. Although many channels are received by the dish, the IRD is programmed to decode only the channels to which the user has subscribed and paid for.

Direct Broadcast Satellite (DBS) television services such as DirecTV, and DISH Network, (owned by Echostar), broadcast via satellite television and radio programs to consumers who purchase or lease IRDs for receiving such programs and pay a monthly subscription fee to receive a selected array of channels. The DBS companies offer a very wide and extensive variety of available channels priced at different levels, as well as special programs which are sometimes known as "Pay per View" (PPV), for which the subscriber must order individually and for which a one time viewing fee is charged.

It is well known that there are people known as hackers or pirates who attempt to obtain DBS services without paying the appropriate subscription fee, thereby depriving the broadcasters and DBS companies of a return on their investment, and also ultimately depriving artists of royalties on their creative works since such royalties often depend on the number of viewers who subscribe to a particular broadcast. The DBS companies have attempted a wide variety of Electronic Counter-Measures (ECMs) but, for each ECM, people In the hacker and Piracy community develop methods and apparatus (hacks) to overcome it and continue to obtain free satellite broadcasts, including premium channels as well as PPV broadcasts. For technologically inclined hackers, each ECM presents an interesting software or hardware challenge that must be overcome in order to prove to himself and others in the hacker community that he or she is smarter than the engineers who design the circuits and ECMs. For other hackers, there is an anti-establishment view or a something-for-nothing objective.

Many of the DBS hacks involve applying a voltage to the programming enable pin of the flash memory chip (for example the $\overline{RP}$ pin in ST M29W320) and then reprogramming the boot sector of the flash memory by use of a JTAG (Joint Test Action Group, IEEE 1149.1) device to read from and write to the TSOP (Thin Small Outline Package) flash.

It is an object of the present invention to provide a solution to the hacking problem with IRDs.

It is a further object to provide a hardware lock to prevent boot sector reprogramming.

DISCLOSURE OF INVENTION

These objects, and others which will become apparent from the following disclosure and drawing, are addressed by the present invention which comprises in one aspect a method of manufacture of IRDs comprising permanently locking the boot sector of the flash memory so that any attempts to reprogram the boot sector by a consumer will result in damage to the IRD.

In another aspect, the invention comprises an improved IRD that comprises a microprocessor having an electronically erasable and reprogrammable flash memory having a boot sector, which is programmed and thereafter connected by a jumper wire or resistor to the reset line of the processor so as to prevent reprogramming of the boot sector after the manufacture of the IRD.

Another aspect of the invention is a populated circuit board for use in a set-top box, the board containing a hardware component which prevents unauthorized reprogramming of the boot sector of the programmable memory by causing voltage applied to the programming enable pin of the programmable memory in an unauthorized attempt to reprogram it to be applied to the reset lines of the microprocessor and the reset circuit, thereby causing them to be damaged. The populated circuit board comprises a microprocessor having a reset line, a reset circuit having a reset line for generating a reset signal, a programmable memory, preferably a flash memory, having a boot sector and a reset-power down pin (R P). According to the invention, the $\overline{RP}$ pin is connected to the reset lines of the microprocessor and the reset circuit, preferably with a resistor or a jumper wire. The resistor should have a value sufficiently low so that when a programming voltage, typically 12 volts, is applied to the programming enable pin, i.e., $\overline{RP}$ pin, the voltage damages the microprocessor and reset circuit, thereby rendering the set-top box useless.

Set-top boxes functioning as IRDs generally received access cards, known as smart cards, which are programmed with subscription information so that the user is allowed to receive and view the programs for which a subscription has been paid, or for which the satellite broadcaster has authorized decoding and viewing. The smart card holder is usually soldered on the circuit board and, in the case of this invention, is preferably soldered on the board on top of the resistor or jumper to prevent or inhibit physical access to the portion of the circuit board where the resistor or jumper is located after the board is manufactured.

A preferred method of manufacturing the circuit board comprises (a) applying solder paste to a circuit board; (b) placing a microprocessor having a reset line, a programmable memory having boot sectors and a reset-power down pin (RP pin), and a reset chip having a reset line on the circuit board; (c) reflowing the solder paste; (d) programming the programmable memory; (e) locking the boot sectors; and (f) inserting a jumper wire or a resistor to connect the $\overline{RP}$ pin of the flash, the reset line of the reset chip, and the reset line of the microprocessor. It is preferred to validate the code after programming the programmable memory. The programming of the programmable memory step would normally include applying a program enable voltage to the $\overline{RP}$ pin first.

MODES FOR CARRYING OUT THE INVENTION

Figure 1:
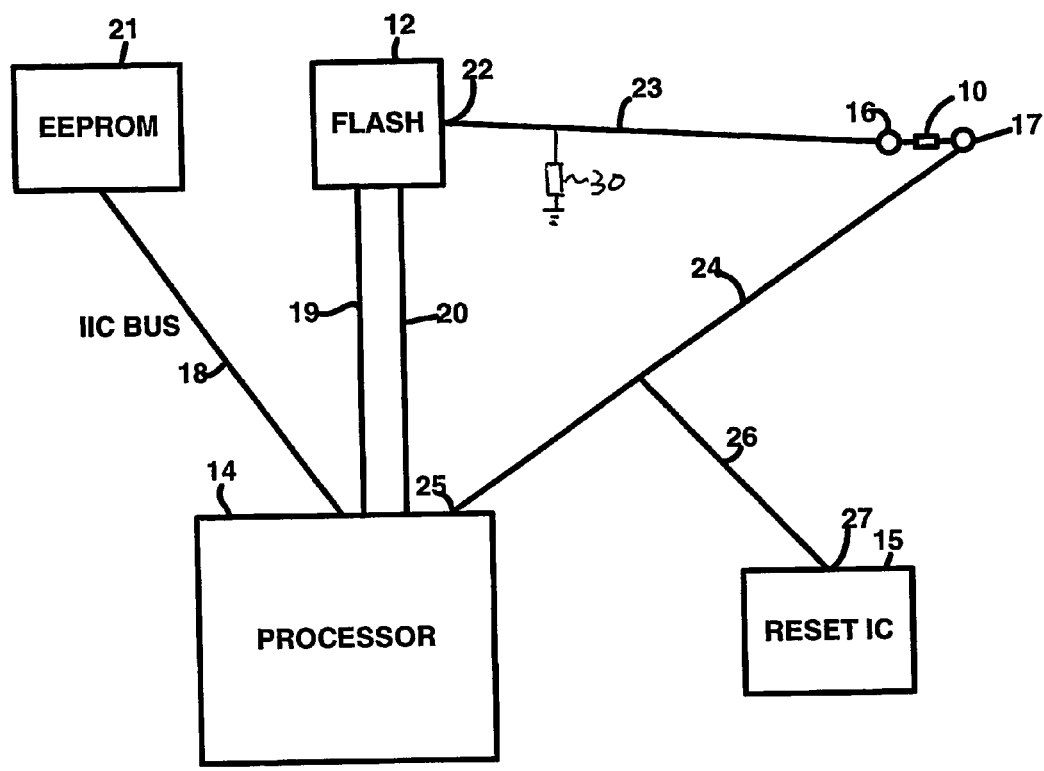
FIG. 1 is a simplified schematic of an IRD showing components affecting the present invention.

While there are many possible modes for carrying out the invention, one specific embodiment will be described in detail.

FIG. 1 is a schematic diagram of certain components and wiring connections of a circuit board having several components and copper traces to connect them. A model ST 24128 8-pin EEPROM 21 (also know as an $E^2$Prom) has a clock and data line, actually two wires which are the IIC bus 18 (also known as an $I^2C$ bus), connected to a model ST DXX 5518 multipurpose processor 14.

Processor 14 has address bus 19 and data bus 20 connecting to an ST M29W320 48 pin TSOP flash memory 12 via copper traces on the circuit board.

The flash memory 12 has a $\overline{RP}$ pin 22 (pin #12 in ST M29W320) to which 12 volts (the programming voltage) may be applied to reprogram the flash. The $\overline{RP}$ pin is also known as the programming enable pin. The $\overline{RP}$ pin supports other two levels, ground and +5 volts, used as a reset for flash. When $\overline{RP}$ pin is held at ground level, the flash memory 12 is inaccessible for reading or writing. For other types of flash memory, the programming enable pin may not be the $\overline{RP}$ pin. For example, the $V_{PP}$ pin of INTEL® 28F320C3 may be considered as a programming enable pin.

After the flash is programmed, a 47-ohm, 0.25 watt resistor 10 is installed between holes 16 and 17. Hole 16 has a copper trace 23 to flash memory $\overline{RP}$ pin 22, and hole 17 has a copper trace 24, which connects with processor 14 at pin 25 (#124), and to trace 26, which leads to reset IC 15 at pin 27 (#6).

The copper trace 23 is also coupled to ground through a resistor 30. The resistor 30 is a 10-kilo ohm, 0.1-watt resistor. The resistance of the resistor 30 can be ranged from 4 kilo ohms to 22 kilo ohms, so long as the resistor 30 will not be burned when a programming voltage is applied at the $\overline{RP}$ pin 22.

Reset IC 15 is an 8-pin integrated circuit, model M51957B. Pin 27 (#6) is the reset line of reset IC 15.

A suitable manufacturing method for population of a circuit board is to start with a raw board, screen solder paste, load chip parts and integrated circuits (ICs), reflow solder in an oven to melt the solder, perform top side integrated circuit testing (ICT), perform flash programming while the flash memory is on the circuit board, insert axial components, i.e., components with leads, including the special resistor 10 or jumper wire parts which are connected to the programming enable pin 22 of the flash memory and the reset line 25 of the microprocessor, and the reset pin 27 (pin #6) of reset IC 15, performing a wave solder step, bottom side ICT, performing an ATE test, instrument assembly, final test, and pack to produce the populated circuit board. Of course, the flash memory 12 can also be programmed before being connected to the circuit board.

As is conventional, the software code for the flash programming is validated prior to storing it in the flash memory. A boot loader is a program to validate and launch application code stored in flash memory. If the application code is corrupted, the boot loader launches recovery code to obtain another copy of the application code. If the validation process in the boot loader is safe, then the rest of the software is considered safe.

If a jumper is used instead of a resistor, it is merely a wire between holes 16 and 17.

In a preferred embodiment, a smart card connector, not shown, is soldered on top of the portion of the circuit board having the resistor or jumper wire 10 to prevent access to the resistor or jumper wire.

In order to protect IRDs (Integrated Receiver Decoders) from having the software code re-programmed by unauthorized parties, the boot sector of the flash memory needs to be hardware locked by disallowing the application of the programming voltage to the $\overline{RP}$ pin 22. Although illustrated as locking the boot sector, other sectors can be similarly protected.

According to the present invention, a new circuit design and method of manufacturing thereof is provided wherein programming method associated therewith which requires a jumper in series, or a low value of resistor (the resistor must be low enough value to cause destruction if programming voltage is applied) with the $\overline{RP}$ pin to be inserted after reflowing and topside ICT (In Circuit Test) and flash programming. Any resistor with sufficiently low power rating that a voltage of 12 volts across it will burn it out can be used, for example one having a resistance of 25 ohms at 0.25 watts, or ones having a resistance of less than 100 ohms at 0.25 watts. For resistors rated with lower wattages, resistors having greater that 100-ohm resistances could be used. The method comprises programming and locking the flash boot sector prior to adding the resistor or jumper on the board. Once the resistor or jumper is added, if the required voltage (e.g., 12 volts) is applied to the $\overline{RP}$ pin, the components on the reset line will be destroyed, and the IRD system thereby becomes inoperative.

It is unlikely that a hacker is able to cut the connection between holes 16 and 17. Even if a hacker is able to cut the connection between holes 16 and 17, the hacker would not be able to reprogram the flash memory 12 because the $\overline{RP}$ pin 22 is coupled to ground through the resistor 30, making the flash memory 12 inaccessible for reading and writing.

This new circuit design and programming method allows the programming to occur with the flash chip on-board, as opposed to an off-line programming process prior to the chips being placed on the board. Therefore, this programming method allows a more efficient product flow and less chance of causing an undesirable physical damage (such as with bending a pin of the flash memory chip) since the programming has taken place after physical implementation of the flash memory chip on a circuit board. The disclosed new circuit design and programming method also reduces handling and labor in a factory.

It will be understood that many additional changes in the details, materials, steps and arrangement of parts, which have been herein described and illustrated in order to explain the nature of the invention, may be made by those skilled in the art within the principles, spirit, and scope of the invention.

The invention claimed is:

1. A set top box for receiving television broadcast signals and decoding selected signals for display on a television set including a circuit board, comprising:
   a microprocessor having a reset line;
   a reset circuit having a reset line for generating a reset signal;

a programmable memory for storing executable code, the programmable memory having a programming enable pin for reprogramming the programmable memory;

means for connecting the programming enable pin to the reset line of the microprocessor and the reset line of the reset circuit;

wherein the microprocessor and the reset circuit are damaged upon application of a programming voltage to the programming enable pin in an attempt to reprogram the flash memory.

2. The set top box of claim 1 wherein the connecting means comprises a resistor or jumper.

3. The set top box of claim 2 wherein the resistor or jumper has a value sufficiently low so that when programming voltage is applied to the programming enable pin, damage is caused to the microprocessor.

4. The set top box of claim 2 wherein the resistor or jumper has a resistance of less than 100 ohms at 0.25 watts.

5. The set top box of claim 4 wherein the programming voltage is 12 volts.

6. The set top box of claim 1 wherein the programmable memory is a flash memory.

7. The set top box of claim 1 adapted to function as an integrated receiver decoder for reception of satellite broadcast from a broadcast seivice provider and decoding television programs for display on a television set, adapted to display only television programs authorized by a satellite broadcast provider.

8. The set top box of claim 1 wherein the programming enable pin is coupled to ground through a second resistor.

9. The set top box of claim 8 wherein the second resistor has a resistance of over 4 kilo ohms at 0.1 watts.

10. The set top box of claim 1, wherein the programmable memory has a boot sector, and the executable code is saved in the boot sector.

11. A method of preventing unauthorized reprogramming of a set top box after manufacture, the set top box comprising a programmable flash memory having a programming enable pin, a microprocessor having a reset line, and a reset circuit having a reset line, the method comprising (a) installing the programmable flash memory on a circuit board:

(b) applying a programming voltage to the programming enable pin;

(c) programming the programmable memory;

(d) connecting the programming enable pin to the reset lines;

wherein upon applying a programming voltage to the programming enable pin in an attempt to reprogram the flash memory, the microprocessor is damaged; and (e) soldering the circuit board.

12. The method of claim 11, wherein step (d) also includes installing a resistor or a jumper between the programming enable pin and the reset lines.

13. The method of claim 11, wherein step (a), comprises the steps of:

(a1) applying solder paste to a circuit board;

(a2) placing the microprocessor, the programmable memory, and the reset circuit on the circuit board; and (a3) reflowing the solder paste.

14. The method of claim 13, further comprising, after step (d), the step of:

(f) inserting a resistor or a jumper to connect the programming enable pin of the flash memory, the reset line of the reset circuit, and the reset line of the microprocessor.

15. The method of claim 14 further comprising the step of placing a hardware component on top of the resistor or jumper, thereby inhibiting access to the resistor or jumper after the circuit board is manufactured.

16. The method of claim 15 wherein the hardware component is a smart card connector.

17. The method of claim 14 further including the step of validating code after programming the programmable memory.

18. The method of claim 14 wherein the programmable memory is a flash memory having a boot sector.

* * * * *